United States Patent [19]

Layh

[11] Patent Number: 5,097,404
[45] Date of Patent: Mar. 17, 1992

[54] SUPPLY CIRCUIT OR POWER SUPPLY UNIT FOR SUPPLYING ELECTRONIC DEVICES OR THE LIKE WITH CURRENT OR VOLTAGE

[75] Inventor: Hans-Dieter Layh, Anna Maria, Fla.

[73] Assignee: Technology Service Inc., Anna Maria, Fla.

[21] Appl. No.: 637,825

[22] Filed: Jan. 7, 1991

[30] Foreign Application Priority Data

Jan. 8, 1990 [DE] Fed. Rep. of Germany ....... 4000303

[51] Int. Cl.$^5$ .............................................. H02M 7/00
[52] U.S. Cl. .................................... 363/146; 363/144; 363/125; 361/399; 336/65; 336/229
[58] Field of Search ............... 363/125, 126, 141, 144, 363/146; 336/65, 229; 361/382, 383, 386, 388, 395, 399

[56] References Cited

U.S. PATENT DOCUMENTS

| | | | |
|---|---|---|---|
| 3,237,137 | 2/1966 | Flaminio | 336/229 X |
| 3,541,433 | 11/1970 | Davis . | |
| 4,470,002 | 9/1984 | Brown | 361/386 X |
| 4,788,624 | 11/1988 | Strange | 361/272 |
| 4,794,510 | 12/1988 | Wege | 363/145 |
| 4,868,533 | 9/1989 | Ehrenhalt et al. | 336/229 X |

FOREIGN PATENT DOCUMENTS 2536598  5/1984  France .

Primary Examiner—Steven L. Stephan
Assistant Examiner—Emanuel T. Voeltz
Attorney, Agent, or Firm—Evenson, Wands, Edwards, Lenahan & Mckeown

[57] ABSTRACT

A supply circuit for supplying electronic devices with current or voltage and mountable as a module has input and output connections, a rectifier cirucit, a transformer having a primary winding coupled with the inputs of the supply circuit and a secondary winding coupled with the rectifier circuit and at least one high-capacity capacitor. The capacitor is coupled with an output of the rectifier circuit for smoothing generated direct current or direct voltage. The capacitor has a housing which housesd the capacitor, the rectifier circuit and the transformer in or on the housing. The input and output connections are arranged on the housing so as to be accessible from outside of the housing. At least a parat of the housing consists of a magnetizable material and carries the primary and secondary windings in the manner of a winding body.

16 Claims, 2 Drawing Sheets

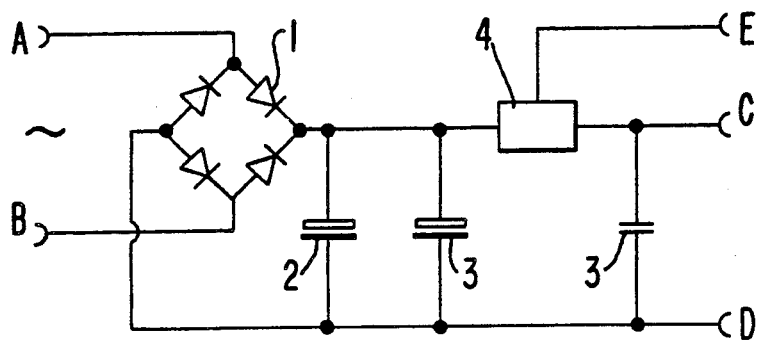
FIG. 1
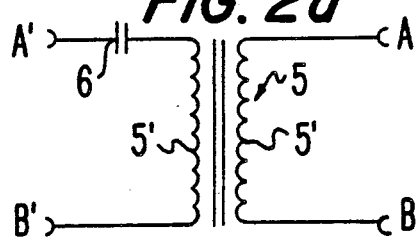
FIG. 2a
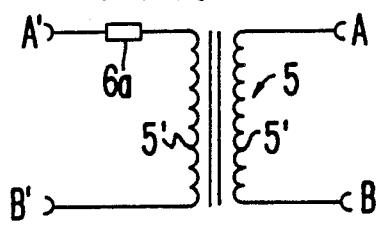
FIG. 2b
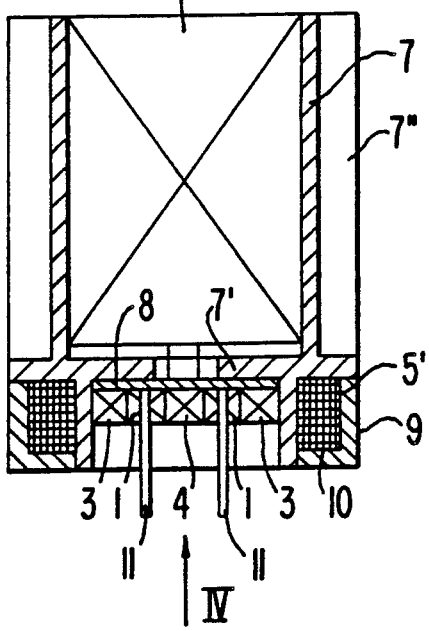
FIG. 3
FIG. 4

SUPPLY CIRCUIT OR POWER SUPPLY UNIT FOR SUPPLYING ELECTRONIC DEVICES OR THE LIKE WITH CURRENT OR VOLTAGE

BACKGROUND AND SUMMARY OF THE INVENTION

The present invention relates to a supply circuit or a power supply unit for supplying electronic devices with current or voltage, having a rectifier circuit and a transformer, the primary winding of which is connected with the inputs of the supply circuit and the secondary winding of which is connected with the rectifier circuit. The supply circuit or power supply unit has at least one high-capacity capacitor connected on the output side of the rectifier circuit for the smoothing of the generated direct current or the generated direct voltage.

Supply circuits of the above type are required in large numbers in order to be able to supply electronic equipment via the public electricity supply network. According to the Swiss Patent Document CH-PS 621 216 which illustrates a circuit of this type, these circuits are always constructed of discrete elements. In this known circuit, the elements may be arranged on printed circuit boards which generally also carry the elements or integrated circuits of the electronic device to be supplied. This means that the supply circuit must generally be constructed together with the electronic device. This leads to relatively high manufacturing expenditures for the electronic device.

Although supply circuits may be used whose discrete elements, together with a transformer, are mounted on a separate printed circuit board and are cast together to form a block, this construction has the disadvantage that it requires a lot of space. Compact and completely prefabricated supply circuits or power supply units for different electronic devices so far have not been developed, despite an existing demand.

The U.S. Pat. No. 3,541,433 shows a power circuit at which, on the output side, high currents (of, for example, 200 A) can be tapped at a low voltage, for example, 3 V. This circuit essentially shows a transformer arrangement and semiconductor elements, in which the winding bodies of the transformer windings also carry the semiconductor elements and are provided with cooling ribs for the carrying away of considerable amounts of heat which are generated by the semiconductor elements because of the high current intensities.

The German Patent Documents DE-PS 34 28 210 and the DE-PS 27 06 560 each show completely prefabricated high-voltage cascades which essentially comprise semiconductor rectifier elements or diodes and capacitors.

From the German Patent Document DE-OS 31 25 281, an R-C element is known which has a ceramic multi-layer capacitor as well as a resistance path arranged on a cover surface of the multi-layer capacitor. In this case, the element is designed such that an R-C series connection as well as an R-C parallel connection can be established.

The German Patent Document DE-PS 459 705 also illustrates an R-C element which, as an R-C parallel connection, is composed of discrete elements.

From the German Design Documents 71 31 688 and 17 96 813, it is known to develop wound capacitors in a ring shape in such a manner that other elements, such as an electric motor, a battery or semiconductor elements, such as rectifiers or the like, can be arranged inside the cylinder space. In this manner, power supply units for flash light equipment and the like can be produced that are relatively compact and are wrapped by the capacitor.

The U.S. Pat. Document US-PS 47 94 510 shows a rectifier which is constructed to be compact and to withstand high mechanical stress in such a manner that it can be housed on or in the rotor of an electric motor or of a generator.

It is an object of the present invention to provide a compact supply circuit which can be completely prefabricated and is suitable for a large number of electronic devices.

This and other objects are achieved by the present invention which provides a supply circuit for supplying electronic devices with current or voltage and is mountable as a module, the supply circuit comprising input and output connections, a rectifier circuit, a transformer having a primary winding coupled with the inputs of the supply circuit and a secondary winding coupled with the rectifier circuit and at least one high-capacity capacitor. The capacitor is coupled with an output of the rectifier circuit for smoothing generated direct current or direct voltage. The capacitor has a housing which houses the capacitor, the rectifier circuit and the transformer in or on the housing. The input and output connections are arranged on the housing so as to be accessible from outside of the housing. At least a part of the housing consists of a magnetizable material and carries the primary and secondary windings in the manner of a winding body.

The present invention utilizes the recognition that supply circuits of the earlier-described type each have at least one high-capacity capacitor and a correspondingly large housing which must be enlarged only slightly in order to arrange in it or on it the other parts of the supply circuit. Thus a supply module can be created with a particularly low space requirement.

According to the present invention, particularly little space is required also for the transformer because the housing of the high-capacity capacitor which is made of a magnetizable material or a magnetizable housing part is used as the winding and supporting body for the transformer windings. The housing therefore has a double function in that it is used as a winding and supporting body for the transformer windings as well as a wrapping for the capacitor.

Although on the basis of this construction according to the invention, the efficiency of the transformer may be slightly lower than that of a conventional discrete transformer, this results in no serious disadvantage because the possible impairment of the efficiency is more than compensated by the particularly compact construction permitted in the invention. At the same time, the design according to the present invention takes the fact into account that the power requirement of most electronic devices is so low that a good efficiency of the supply circuit is negligible. It should be noted that, by means of the transformer, a galvanic separation is ensured between the inputs of the supply circuit which are generally connected to the public electricity network, and its outputs which are connected with the respective device to be supplied which is often sensitive.

In addition, an annulus may be arranged on the housing for receiving the primary and secondary windings of the input transformer, this annulus having at least one annular wall area made of a magnetizable material. In this case, a particularly high efficiency of the transformer is reached if the annulus is completely enclosed with a magnetizable material. The housing parts forming the annulus may be constructed as parts that are separate from the capacitor housing.

In an embodiment constructed according to the present invention, heat-conducting elements of the supply circuit, such as rectifier diodes and voltage regulators, are arranged in a heat-conducting contact with the housing in order to carry off the forming heat. Thus, the housing may also have a cooling function. If necessary, cooling ribs may be arranged on the housing in order to improve the removal of heat.

In an embodiment of the present invention, the input as well as the output connections of the supply circuit are constructed as holding elements in order to be able to house the module formed by the supply circuit according to the invention more easily in the device to be supplied.

Other objects, advantages and novel features of the present invention will become apparent from the following detailed description of the invention when considered in conjunction with the accompanying drawings.

BRIEF DESCRIPTION OF THE DRAWINGS

FIG. 1 is a circuit diagram of a supply circuit constructed according to an embodiment of the present invention, in which the input transformer was not included.

FIG. 2a is an input transformer for the supply circuit of FIG. 1, in which the primary winding is coupled with the input connection via a capacitor.

FIG. 2b is an input transformer for the supply circuit of FIG. 1, in which the primary winding is coupled with the input connection via a resistor.

FIG. 3 is a diagrammatic longitudinal sectional view of the supply circuit of FIG. 1.

FIG. 4 is a front view of the supply circuit corresponding to the arrow IV in FIG. 3.

DETAILED DESCRIPTION OF THE DRAWINGS

Figure 5:
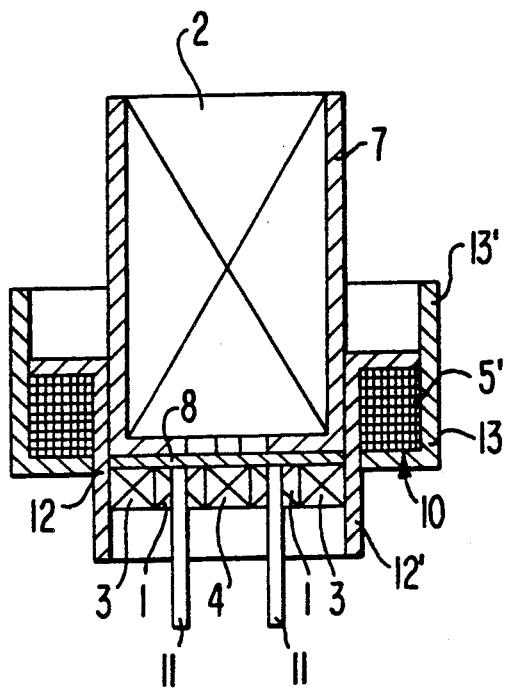
FIG. 5 is a longitudinal sectional view of another embodiment of the present invention.

According to FIG. 1, the supply circuit, in a manner known per se, has rectifier elements 1, such as diodes, which, on one side, are electrically connected with input lines A and B and, on the other side, with output connections C and D. If an electric alternating voltage or alternating current is fed to the input lines A and B, an electric direct voltage or direct current can be tapped at the output connections C and D.

In order to smooth the direct voltage or direct current on the output side, a high-capacity capacitor 2, such as an electrolyte capacitor, is connected between the output connections C and D. Also, several low-capacity capacitors 3 can be coupled in a parallel connection, as shown in FIG. 1.

A voltage regulator 4, as a rule an integrated circuit (IC) which can be controlled by way of an input line E, may be arranged in the line leading to the output connection C.

According to FIG. 2, the input lines A and B are connected by way of an input transformer 5, with an alternating voltage source or alternating current source which is connected to the inputs A' and B'.

Corresponding to the ratio of the winding numbers of the primary and secondary windings of the transformer 5, a voltage transformation of the fed alternating voltage then takes place in a known manner, in which case, as a rule, the voltage between lines A and B is clearly lower than the voltage between connections A' and B'.

According to an embodiment of the present invention, the primary winding of the transformer 5 is connected with at least one of the connections A' or B' via an input capacitor 6. If the input capacitor 6 has a sufficiently low capacity, it acts to limit the alternating currents flowing through the primary winding of the transformer 5. Correspondingly, the power which can be transmitted by the transformer 5 in its secondary winding is limited, with the result that only a relatively low voltage difference can be maintained between output connections C and D if a consumer with a relatively low electric resistance is connected to the output connections C and D. In this manner, the direct voltage which is applied to the output connections C and D can be adjusted to values which are less than expected because of the ratio of the winding numbers of the primary and secondary windings of the transformer 5. This means that the output voltage may also remain relatively low if a relatively high alternating voltage is applied to the input connections A' and B', and the ratio of the winding numbers between primary and secondary windings of the transformer 5 is comparatively low. In this manner, the number of windings of the primary winding can be reduced relative to the number of windings of the secondary winding.

With respect to the ratio of the winding numbers of the transformer 5, a similar result can be achieved if an input resistor 6' is arranged instead of the input capacitor. The input capacitor 6 has the advantage that it operates virtually without emitting any heat.

According to FIG. 3, the supply circuit may be constructed as a module that can be completely prefabricated and which can be inserted in a particularly simple manner into the respective electronic device to be supplied. For this purpose, only the output connections C and D of the supply circuit as well as possibly the input line E must be connected with the device to be supplied and the input connections A' and B' must be connected with the network cable of the device.

The module has a cup-shaped housing 7 which receives the high-capacity capacitor 2 which is constructed, for example, as an electrolyte capacitor. In contrast to a conventional capacitor 2 of this type having its own housing, the housing 7 in FIG. 3 is slightly enlarged toward the bottom in such a manner that a small additional space is created on the underside of the housing bottom 7'. In this additional space, a printed circuit 8 is inserted which carries the rectifier elements 1, the additional low-capacity capacitors 3 as well as a voltage regulator 4 and electrically connects them with one another according to FIG. 1 by way of corresponding line paths. The connections of the high-capacity capacitor 2 are guided through an opening in the housing bottom 7' to the printed circuit board 8.

Since the rectifier elements 1 generate heat during the operation, the printed circuit board 8 or the rectifier elements are arranged in a heat-conducting connection with the housing 7, for example, in that the printed circuit board 8 and/or the rectifier elements 1 are connected with the housing 7 by means of a thin, electrically insulating adhesive layer. In this manner, the heat formed can be conducted toward the outside via the housing 7. If necessary, the removal of heat can be improved by the provision of cooling ribs 7" on the housing 7.

The windings 5' of the input transformer 5 which is shown schematically in FIG. 2 are arranged directly on a section of the housing 7, in which at least the housing part carrying the windings 5' should consist of a magnetizable material, such as iron or the like. In order to further improve the magnetic closing between the windings 5' of the transformer 5, in the embodiment of FIG. 3 the windings 5' are enclosed on the outside by a ring part 9 made of a magnetizable material in such a manner that the windings 5' are housed in an annulus 10 which is enclosed by a magnetizable material virtually on all sides.

The electric connection of the transformer windings 5' with the printed circuit board 8 or with the input connections A' and B' arranged on the underside of the housing 7 takes place by openings or slots in the wall of the housing 7 which are not shown.

The input capacitor 6 (also compare FIG. 2) may basically also be arranged in the annulus 10. However, it is also possible to arrange this capacitor 6 instead on the printed circuit board 8.

As a result of the construction according to the present invention, only little additional space is required for the transformer 5. At the same time, the possibility is provided of transforming the input voltage corresponding to the respective necessities and to galvanically separate the electronic device to be supplied completely from the inputs A' and B'.

The space of the housing 7, which is on the bottom in FIG. 3, after all elements of the supply circuit have been arranged, may be filled with plastic or the like in such a manner that only the connection pins 11 or the like protrude. These connection pins 11 form connections A' and B' as well as connections D to E in FIGS. 1 and 2 (see FIG. 4), and are also suitable for holding the supply circuit in a device. For example, similar to a conventional electronic tube, the supply module, by means of the connection pins 11, may be inserted into a fitted base.

In FIG. 5, an embodiment is illustrated which differs from the embodiment according to FIG. 3 because the annulus 10 for the transformer windings 5' is formed by housing parts 12 and 13 which are separated from the housing 7 of the capacitor 2. The housing parts 12 and 13 are made of a magnetizable material, such as iron, whereas the housing 7 of the capacitor may be made of a basically arbitrary material, such as aluminum or another non-magnetizable material.

In the illustrated embodiment, the housing parts 12 and 13 each have an L-shaped cross-section, the radially interior housing part 12, by means of its one L-leg 12', firmly enclosing the exterior wall of the housing 7 of the capacitor 2. In this case, the leg 12' of the housing part 12 may be a continuation of the capacitor housing 7 in FIG. 5 in the downward direction in such a manner that a receiving space is formed for the additional elements, such as the rectifiers 1, the capacitors 3, 6 and the voltage regulator 4. The L-leg 13' of the housing part 13, arranged concentrically with respect to the L-leg 12' of housing part 12, may continue in the upward direction in FIG. 5. In this manner, the overall surface of the housing parts 12 and 13 is enlarged in order to permit, if necessary, an improved radiation of heat. The L-legs 12' and 13' may also take over the function of cooling surfaces by means of which the heat is removed that is generated particularly by the rectifier elements 1. For improving heat removal, the rectifier elements 1 can be arranged in a particularly good heat-conducting connection with respect to the housing parts 12 or 13.

During the manufacturing of the embodiment shown in FIG. 5, the housing parts 12 and 13 may individually (or after the arrangement of the transformer windings 5' in the annulus 10) jointly be slid onto the capacitor housing 7.

If necessary, the housing parts 12 and 13 may form a unit with the transformer windings 5' as well as the additional elements of the supply circuit, such as the rectifier elements 1, the capacitors 3, 6, the voltage regulator 4 and the like, which can be completely premounted and which is placed on the capacitor housing 7.

Deviating from the embodiment illustrated in FIG. 5, the housing part 12, in the area of the transformer winding 5', may also have a U-shaped cross-section, preferably with a U-opening which is directed laterally toward the outside, in which case, the arrangement of a housing part 13 which closed off the space 10 for the transformer windings 5' toward the outside is not necessary.

Figure 6:
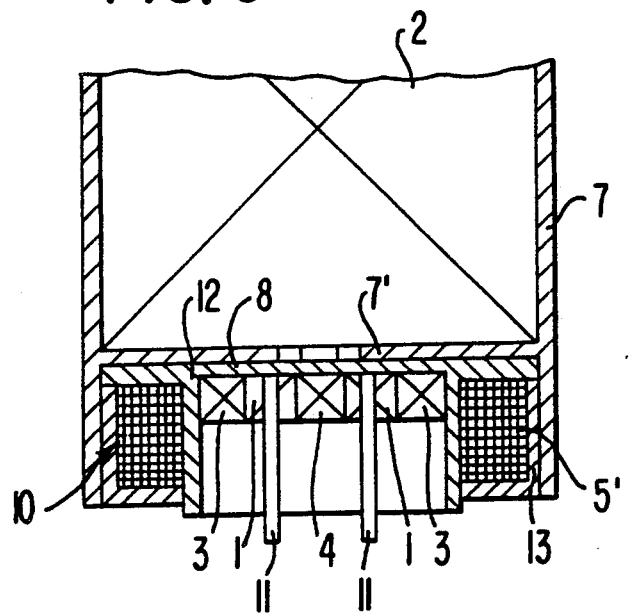
FIG. 6 is a longitudinal sectional view of still another modified embodiment of the present invention.

The embodiment illustrated in FIG. 6 differs from the embodiment according to FIG. 5 mainly due to the annulus 10 for the transformer windings 5' that is formed by the housing parts 12 and 13, on its exterior side, being enclosed by parts of the capacitor housing 7. In this embodiment, the housing parts 12 and 132, if necessary, may be pushed into a cylindrical extension of the capacitor housing 7.

Deviating from the illustrated embodiment, in which the housing parts 12 and 13 again have an L-shaped cross-section, the housing part 12, in the area of the transformer windings 5', may again have a U-shaped cross-section, again with a U-opening which is laterally directed toward the outside. In this case, the housing part 12, which is constructed in this manner, may be arranged directly in a cylindrical extension of the capacitor housing 7 in such a manner that an area of the capacitor housing 7 closed off toward the outside the annulus for the transformer windings 5' which is formed between the U-legs of the housing part 12.

In addition, the housing part 12 again encloses a space for receiving the other elements of the supply circuit, for example, the rectifier elements 1, the capacitors 3, 6 and the voltage regulator 4. These elements, together with the housing part 12 or the housing parts 12 and 13 as well as the transformer windings 5', may form a unit which can be premounted and which can be placed in the corresponding section of the capacitor housing 7.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A supply circuit for supplying an electronic device with current or voltage and mountable as a module, comprising:
   input and output connections;
   a rectifier circuit;
   a transformer having a primary winding coupled with the input connections of the supply circuit and a secondary winding coupled with an input of the rectifier circuit;

at least one high-capacity capacitor coupled with an output of the rectifier circuit for smoothing generated direct current or direct voltage, said capacitor having a cavies which houses the capacitor, the rectifier circuit and the transformer, with said input and output connections arranged on said housing so as to be accessible from outside of said housing, said output connections being adapted to the electrically connect to said electronic device, with at least a part of said housing consisting of a magnetizable material and carrying the primary and secondary windings in the manner of a winding body.

2. A supply circuit according to claim 1, wherein at least one of the input or output connections are constructed as holding elements of the module.

3. A supply circuit according to claim 2, wherein heat-generating elements of said supply circuit are arranged in a heat-conducting contact with the housing.

4. A supply circuit according to claim 3, further comprising cooling ribs arranged on the housing 5. A supply circuit according to claim 4, further comprising an input capacitor, and wherein the primary winding of the input transformer is electrically connected in series with said input capacitor.

6. A supply circuit according to one of claim 4, further comprising an input resistor, and wherein the primary winding of the input transformer is electrically connected in series with said input resistor.

7. A supply circuit according to claim 6, wherein the housing includes an annulus that receives the primary and secondary windings of the input transformer, the annulus having at least one annular wall area made of a magnetizable material.

8. A supply circuit according to claim 7, wherein the annulus includes a separate ring part, with one side of the annulus being formed by the housing, and another side being formed by the separate ring part.

9. A supply circuit according to claim 7, further comprising ring parts which enclose the annulus, said ring parts being separate from the capacitor housing and which are pushed onto the housing from the outside.

10. A supply circuit according to claim 7, further comprising ring parts which enclose the annulus, said ring parts being separate from the capacitor housing and which are pushed on the inside into an extension of the housing.

11. A supply circuit according to claim 9, wherein at least one of the wall areas or ring parts forming the annulus include extensions for the formation of cooling surfaces.

12. A supply circuit according to claim 5, wherein the housing includes an annulus that receives the primary and secondary windings of the input transformer, the annulus having at least one annular wall area made of a magnetizable material.

13. A supply circuit according to claim 12, wherein the annulus includes a separate ring part, with one side of the annulus being formed by the housing, and another side being formed by the separate ring part.

14. A supply circuit according to claim 12, further comprising ring parts which enclose the annulus, said ring parts being separate from the capacitor housing and which are pushed onto the housing from the outside.

15. A supply circuit according to claim 12, further comprising ring parts which enclose the annulus, said ring parts being separate from the capacitor housing and which are pushed on the inside into an extension of the housing.

16. A supply circuit according to claim 14, wherein at least one of the wall areas or ring parts forming the annulus include extensions for the formation of cooling surfaces.

* * * * *